United States Patent
Park et al.

(10) Patent No.: US 8,737,361 B2
(45) Date of Patent: May 27, 2014

(54) METHOD AND APPARATUS FOR TRANSMITTING SIGNAL IN COMMUNICATION SYSTEM

(75) Inventors: Hyeong-Geun Park, Daejeon (KR); Il-Gyu Kim, Seoul (KR); Young-Jo Ko, Daejeon (KR); Kap-Seok Chang, Daejeon (KR); Hyo-Seok Yi, Daejeon (KR); Young-Hoon Kim, Daejeon (KR); Seung-Chan Bang, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1520 days.

(21) Appl. No.: 12/307,909

(22) PCT Filed: Jul. 5, 2007

(86) PCT No.: PCT/KR2007/003267
§ 371 (c)(1),
(2), (4) Date: Sep. 9, 2009

(87) PCT Pub. No.: WO2008/004823
PCT Pub. Date: Jan. 10, 2008

(65) Prior Publication Data
US 2010/0020901 A1 Jan. 28, 2010

(30) Foreign Application Priority Data

| Jul. 7, 2006 | (KR) | 10-2006-0063834 |
| Aug. 25, 2006 | (KR) | 10-2006-0081133 |
| Dec. 1, 2006 | (KR) | 10-2006-0120309 |

(51) Int. Cl.
H04W 4/00 (2009.01)
H04H 20/67 (2008.01)

(52) U.S. Cl.
USPC .......................................... 370/334; 370/339

(58) Field of Classification Search
USPC .......................................... 370/334
See application file for complete search history.

(56) References Cited

U.S. PATENT DOCUMENTS

| 5,867,478 | A  | * | 2/1999 | Baum et al. | 370/203 |
| 6,240,099 | B1 | * | 5/2001 | Lim et al. | 370/441 |
| 6,785,513 | B1 |   | 8/2004 | Sivaprakasam | |
| 6,985,466 | B1 | * | 1/2006 | Yun et al. | 370/335 |
| 7,751,307 | B2 | * | 7/2010 | Muck et al. | 370/208 |
| 2002/0132624 | A1 | * | 9/2002 | Watanabe et al. | 455/456 |
| 2003/0081538 | A1 | * | 5/2003 | Walton et al. | 370/206 |
| 2003/0216156 | A1 | * | 11/2003 | Chun | 455/562.1 |
| 2004/0053634 | A1 | * | 3/2004 | Gainey et al. | 455/522 |
| 2004/0085892 | A1 | * | 5/2004 | Walton et al. | 370/208 |
| 2004/0166887 | A1 | * | 8/2004 | Laroia et al. | 455/522 |
| 2005/0085265 | A1 | * | 4/2005 | Laroia et al. | 455/560 |
| 2005/0085268 | A1 | * | 4/2005 | Itoh | 455/562.1 |
| 2005/0101352 | A1 | * | 5/2005 | Logothetis et al. | 455/562.1 |

(Continued)

FOREIGN PATENT DOCUMENTS

KR 10-2008-0005104 A 1/2008

*Primary Examiner* — Gerald Smarth
(74) *Attorney, Agent, or Firm* — Jefferson IP Law, LLP

(57) ABSTRACT

When a plurality of sectors transmit the same signal in a communication system, the same signal is transmitted after a weight is applied to the same signal. At this time, defective reception of the same signal in a terminal may be reduced by setting a weight pattern differently according to a symbol transmission time and a sector number.

22 Claims, 13 Drawing Sheets

(56) References Cited

U.S. PATENT DOCUMENTS

| | | |
|---|---|---|
| 2005/0124345 A1* | 6/2005 | Laroia et al. .................. 455/437 |
| 2005/0136963 A1* | 6/2005 | Frank et al. ................... 455/522 |
| 2005/0157776 A1* | 7/2005 | Ryu ............................. 375/148 |
| 2006/0159045 A1* | 7/2006 | Ananthaiyer et al. ........ 370/329 |
| 2006/0251036 A1* | 11/2006 | Gollamudi et al. ........... 370/342 |
| 2007/0099666 A1* | 5/2007 | Astely et al. ................ 455/562.1 |
| 2007/0191067 A1* | 8/2007 | Nguyen et al. ............. 455/562.1 |
| 2007/0224942 A1* | 9/2007 | Kuramoto et al. ......... 455/67.11 |
| 2008/0188236 A1* | 8/2008 | Alles et al. ................. 455/456.1 |
| 2010/0020901 A1* | 1/2010 | Park et al. ..................... 375/299 |

* cited by examiner

Sector boundary angle        Angle

METHOD AND APPARATUS FOR TRANSMITTING SIGNAL IN COMMUNICATION SYSTEM

TECHNICAL FIELD

The present invention relates to a method and an apparatus for transmitting a signal in a communication system. More particularly, the present invention relates to a signal transmitting method and apparatus of a cellular system using orthogonal frequency division multiplexing (OFDM) modulation/demodulation.

This work was supported by the IT R&D program of MIC/IITA [2005-S-404-12, Research & Development of Radio Transmission Technology for 3G evolution].

BACKGROUND ART

There are cases where different sectors transmit the same signal, namely a sector common signal, in a communication system such as a cellular system. The different sectors may be located in the same base station or in different base stations, respectively.

One example of the sector common signal is a broadcast channel. All sectors in the cellular system may use the common signal for the broadcast channels to cancel interference and to obtain a frequency diversity gain. However, transmit antenna beam patterns may be distorted when all sectors in one base station transmit the common signal. When the different sectors in the same base station transmit the common signal, the transmit beam pattern for the common signal generally corresponds to the sum of the values resulting from multiplying an antenna pattern of each sector by a weight. The weight can be given as a time-invariant complex value with random phase. In the worst case where the phase difference between the weights for two sectors in the same base station is 180 degrees, the power of a signal to be transmitted toward the direction of sector boundary where two antenna beams overlap decreases continuously. Accordingly, the performance of the cellular system may be significantly deteriorated.

Another example of the sector common signal is a synchronization channel. When a terminal initially detects a sector having the strongest received power or periodically searches neighboring sectors during operation, the synchronization channels are used. Since a primary synchronization channel among the synchronization channels is used for a terminal to synchronize with a base station, the number of sequences available for the primary synchronization channel is limited lest the configuration of the terminal become complicated. Accordingly, the occurrence of the case where neighboring sectors use a common sequence as the primary synchronization channel is inevitable. In the case where the different sectors use the common sequence as the primary synchronization channel, when the terminal coherently detects a sequence of a secondary synchronization channel by using the channel estimated by the primary synchronization channel, the performance of a search unit is deteriorated. On the other hand, the neighboring sectors may use a common sequence as the secondary synchronization channel according to the arrangement of sectors. For example, the cellular system may be designed such that the different sectors in the same base station use the common sequence as the secondary synchronization channel and use the different primary synchronization channels. In the case where the common sequence is used for the synchronization channel, the transmit antenna beam patterns may be distorted as in the broadcast channel.

DISCLOSURE

Technical Problem

The present invention provides a transmitting apparatus of a base station and a signal transmitting method for reducing defective reception of a common signal transmitted in a communication system.

Technical Solution

To resolve the above problem, according to one exemplary embodiment of the present invention, a method of transmitting a common signal in a first base station is provided, and the common signal is the same as a signal transmitted by a second base station. The method includes setting a weight according to a weight pattern determined by a transmission time of the common signal and a pattern number allocated to the first base station, generating a transmission signal by multiplying the common signal by the weight, and transmitting the transmission signal.

The method may further include generating the common signal by using a sequence allocated to the first base station and the second base station in common.

The weight may be a weight that rotates a phase of the common signal with a phase rotation value. At this time, the phase rotation value may be determined by the transmission time of the common signal and the pattern number allocated to the first base station.

In addition, the first base station may include a plurality of antennas. At this time, the common signal may be multiplied by beam forming weights for the plurality of antennas, and the beam forming weights may be determined by the transmission time of the common signal.

According to another exemplary embodiment of the present invention, a method of transmitting a common signal to a plurality of sectors in a base station is provided. The method includes setting a weight for each of the sectors based on a weight pattern determined by a transmission time of the common signal and a pattern number allocated to each of the sectors, generating a transmission signal for each of the sectors by multiplying the common signal by the weight of each of the sectors, and transmitting the transmission signal to a corresponding sector.

The weight may be a weight that rotates a phase of the common signal with a phase rotation value. The phase rotation value may be determined by the transmission time of the common signal and the pattern number allocated to each of the sectors.

In addition, each of the cells may include a plurality of antennas. At this time, the common signal may be multiplied by beam forming weights for the plurality of antennas in each of the sectors, and the beam forming weights may be determined by the transmission time of the common signal.

According to still another exemplary embodiment of the present invention, a method of generating a signal transmitted in common to a plurality of cells including a first cell and a second cell in a communication system is provided. The method includes generating a common signal to be transmitted to the first cell and the second cell in a first base station and a second base station, generating a signal to be transmitted to the first cell by multiplying the common signal by a first weight in the first base station, and generating a signal to be transmitted to the second cell by multiplying the common signal by a second weight in the second base station.

According to a further exemplary embodiment of the present invention, a method for generating a signal transmitted in common to a plurality of sectors including a first sector and a second sector in a base station is provided. The method includes generating a common signal to be transmitted to the first sector and the second sector, generating a signal to be transmitted to the first sector by multiplying the common signal by a first weight, and generating a signal to be transmitted to the second sector by multiplying the common signal by a second weight.

At this time, the first weight has a first weight pattern determined by a transmission time of the common signal, the second weight has a second weight pattern determined by the transmission time of the common signal, and the first weight pattern may be different from the second weight pattern.

According to a still further embodiment of the present invention, an apparatus for transmitting a common signal in a first base station is provided, and the common signal is the same as a signal transmitted by a second base station. The apparatus includes means for setting a weight according to a weight pattern determined by a transmission time of the common signal and a pattern number allocated to the first station, means for generating a transmission signal by multiplying the common signal by the weight, and means for transmitting the transmission signal.

The apparatus may further include means for generating the common signal by using a sequence allocated to the first base station and the second base station in common.

According to another exemplary embodiment of the present invention, an apparatus for transmitting a common signal to a plurality of sectors in a base station is provided. The apparatus includes means for setting a weight for each of the sectors according to a weight pattern determined by a transmission time of the common signal and a pattern number allocated to each of the sectors, means for generating a transmission signal for each of cells by multiplying the common signal by the weight of each of the sectors, and means for transmitting the transmission signal to each of the sectors corresponding to the transmission signal.

According to still another embodiment of the present invention, an apparatus for generating a signal to be transmitted in common to a plurality of cells including a first cell and a second cell in a communication system is provided. The apparatus includes means for generating a common signal to be transmitted to the first cell in the first base station, means for generating the common signal to be transmitted to the second cell in a second base station, means for generating a signal to be transmitted to the first cell by multiplying the common signal by a first weight in the first base station, and means for generating a signal to be transmitted to the second cell by multiplying the common signal by a second weight in the second base station.

According to still another embodiment of the present invention, an apparatus for generating a signal transmitted in common to a plurality of cells including a first sector and a second sector in a base station is provided. The apparatus includes means for generating a common signal transmitted to the first sector and the second sector, means for generating a signal transmitted to the first sector by multiplying the common signal by a first weight, and means for generating a signal transmitted to the second sector by multiplying the common signal by a second weight.

Advantageous Effects

According to the present invention, when the plurality of sectors use the common signal, defective reception of the same signal in the terminal may be reduced by applying the different weight patterns to the common signal. According to another exemplary embodiment of the present invention, the performance of a cell search may be improved by applying the different weight patterns to the synchronization channels in the plurality of sectors.

MODE FOR INVENTION

Figure 1:
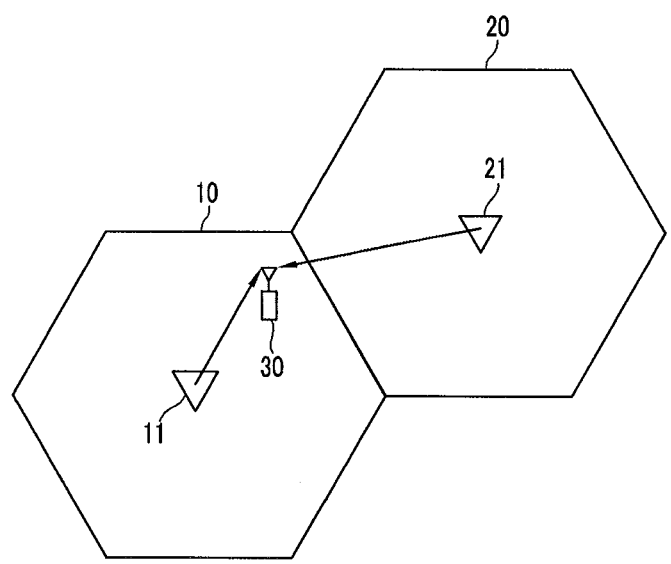
FIG. 1 shows a schematic diagram of a structure of a communication system according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this detailed description and the claims which follow, unless explicitly described to the contrary, the word "comprise/include" or variations such as "comprises/includes" or "comprising/including" will be understood to imply the inclusion of stated elements but not the exclusion of any other elements. Each block is a unit for processing at least one function or operation, which can be realized by hardware, software, or a combination of hardware and software.

Now, signal transmitting methods and signal transmitting apparatuses in a communication system according to exemplary embodiments of the present invention will be described with reference to the drawings.

First, a transmitting apparatus of a base station in a communication system according to a first exemplary embodiment of the present invention will be described with reference to FIG. 1 to FIG. 5.

FIG. 1 is a schematic diagram of a communication system according to the first exemplary embodiment of the present invention.

As shown in FIG. 1, the communication system according to the first exemplary embodiment of the present invention includes a plurality of cells, and each cell includes one base station 11 or 21 managing the corresponding cell. For convenience of explanation, FIG. 1 shows a communication system that has two cells, and it is assumed that each cell includes one sector. In the communication system, a terminal 30 that has a first cell 10, i.e., a first sector, managed by a first base station 11, as a home cell, may receive a signal transmitted from a second base station 21 of a second cell 20, i.e., a second sector. If the two base stations 11 and 21 transmit the same signals, i.e., the common signals, the terminal 20 may not normally receive the common signal from the first station 11 due to a collision of signals from the two base stations 11 and 21. Accordingly, in the first exemplary embodiment of the present invention, when a plurality of base stations transmit the common signal, each base station multiplies the common signal by a weight allocated to the corresponding base station (i.e., cell) before transmitting the common signal.

The signal transmitting method according to the first exemplary embodiment of the present invention will be described with reference to FIG. 2 to FIG. 5. Hereinafter, the common signal used by a plurality of base stations is assumed to be a P-SCH signal that is a sequence used for P-SCH in the first exemplary embodiment of the present invention.

Figure 2:
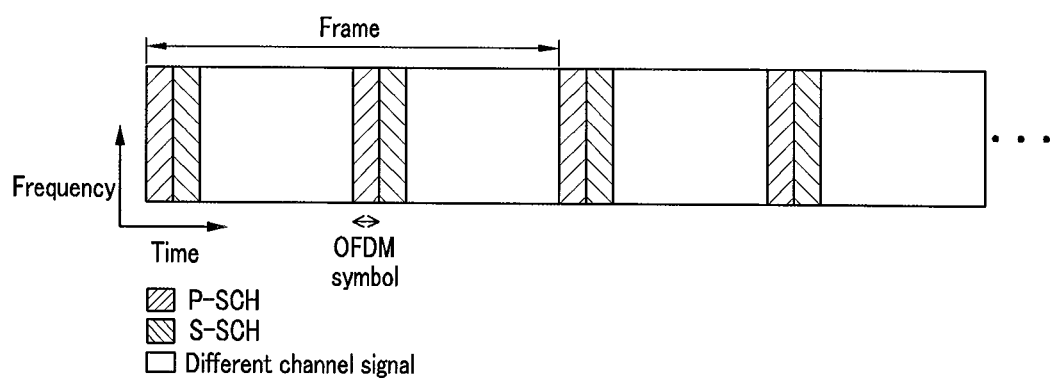
FIG. 2 shows a schematic diagram of a transmission structure of a synchronization channel in a cellular system according to first exemplary embodiment of the present invention.
Figure 3:
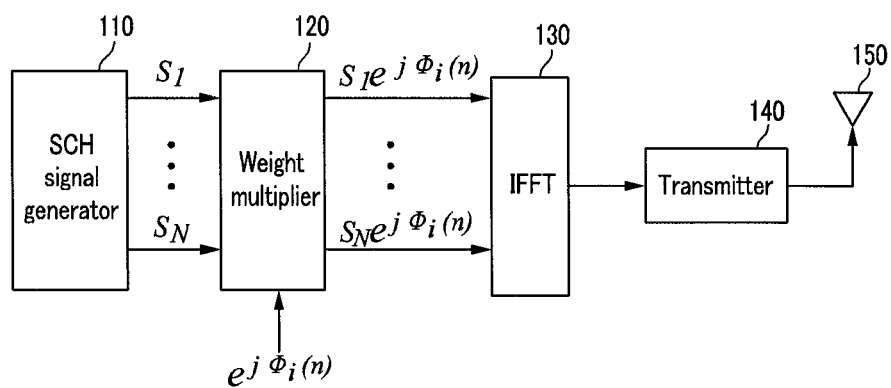
FIG. 3, FIG. 6, and FIG. 8 show schematic diagrams of transmitting apparatuses in base stations according to first, second, and third exemplary embodiments of the present invention, respectively.

FIG. 2 shows a schematic diagram of a transmission structure of a synchronization channel in the cellular system according to the first exemplary embodiment of the present invention. FIG. 3 shows a schematic block diagram of a transmitting apparatus in a base station according to the first exemplary embodiment of the present invention, and FIG. 4 shows a flow diagram of a method for transmitting a signal in a base station according to the first exemplary embodiment of the present invention.

Referring to FIG. 2, two synchronization channels may be included in a downlink frame, and each synchronization channel includes a primary synchronization channel (P-SCH) and a secondary synchronization channel (S-SCH). The P-SCH and S-SCH may be placed in one OFDM symbol, but they are assumed to be placed in different OFDM symbols in FIG. 2. In this case, the P-SCH is used for estimating OFDM symbol timing and channel, and a plurality of base stations may generate the P-SCH by using the different sequences in the communication system according to the first exemplary embodiment of the present invention. However, it is assumed that the plurality of base stations uses the same sequence for generating the P-SCH in the first exemplary embodiment of the present invention. A sector-specific sequence is allocated to an S-SCH symbol and used for detecting a sector number.

As shown in FIG. 3, the transmitting apparatus of the base station according to the first exemplary embodiment of the present invention includes an SCH signal generator 110, a weight multiplier 120, an inverse fast Fourier transformer (IFFT) 130, a transmitter 140, and an antenna 150.

Figure 4:
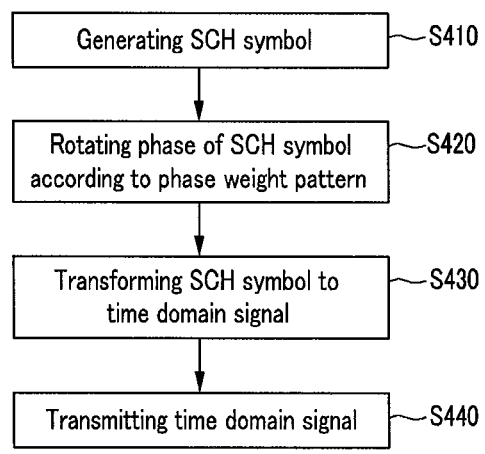
FIG. 4 shows a flow diagram of a method for transmitting a signal of a base station according to the first exemplary embodiment of the present invention.

Referring to FIG. 4, the SCH signal generator 110 generates a P-SCH symbol and an S-SCH symbol by using a P-SCH sequence and an S-SCH sequence, multiplexes the P-SCH symbol and the S-SCH symbol, and then outputs an SCH symbol (step S410). In FIG. 3, $s_k$ represents a symbol to be transmitted with the k-th subcarrier, namely the P-SCH symbol or the S-SCH symbol, and the transmitting apparatus transmits the SCH symbol with N subcarriers. The weight multiplier 120 multiplies the SCH symbol by a weight. The weight may be a phase weight that keeps the size of the SCH symbol constant and changes the phase of the SCH symbol. The phase weight is given as Equation 1. That is, the weight multiplier 120 rotates the phase of the SCH symbol by multiplying the SCH symbol by the phase weight as expressed in Equation 2 (step S420). Here, the phase rotation value $\phi_i(n)$ of the phase weight is determined by an SCH pattern number (i) and an SCH symbol number (n) independently of the subcarrier, and the SCH symbol number (n) is set according to a transmission time of the SCH symbol. Accordingly, the phase rotation value $\phi_i(n)$ has a phase weight pattern, i.e., a phase rotation pattern, that is determined by a cell number and the transmission time of the SCH symbol.

$$e^{j\phi_i(n)} \quad \text{[Equation 1]}$$

$$[s_1, s_2, \ldots, s_N]^T e^{j\phi_i(n)} \quad \text{[Equation 2]}$$

The IFFT 130 transforms the phase-rotated SCH symbol to a time domain signal by performing an inverse fast Fourier transform (step S430), and the transmitter 140 transforms the time domain signal to a radio frequency (RF) signal and then transmits the RF signal through the antenna 150 (step S440). At this time, a parallel/serial converter (not shown) that converts the time domain signal to a serial signal, a cyclic prefix (CP) adder that adds a CP to the series signal, and a digital/analog converter that converts the serial signal added by the CP to an analog signal may be provided between the IFFT 130 and the transmitter 140.

Figure 5:
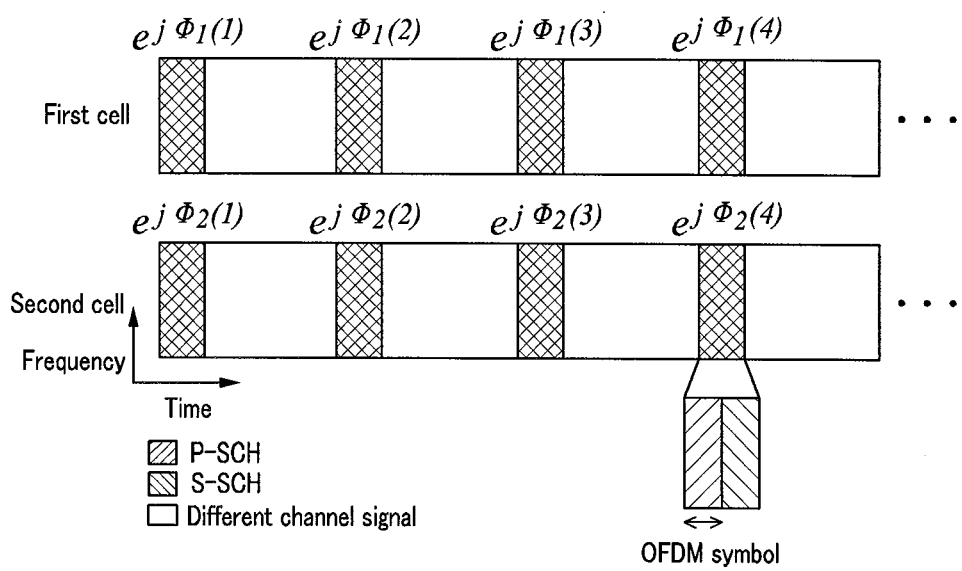
FIG. 5 and FIG. 9 show examples of the phase weight patterns according to the first and third exemplary embodiments of the present invention, respectively.

FIG. 5 shows examples of transmission structures that are made from two different phase weight patterns in the communication system. In detail, the first base station 11 (i.e., the first cell 10) and the second base station 12 (i.e., the second cell 20) in FIG. 1 use a first phase weight pattern and a second phase weight pattern, respectively. In the first phase weight pattern, the phase rotation value $\phi_1(n)$ is always set as 0 degrees independently of the SCH symbol transmission time (n). In the second phase weight pattern, the phase rotation value $\phi_2(n)$ is set as 0 degrees and 180 degrees in turn according to the SCH symbol transmission time (n). Setting the phase weight patterns of two cells differently as in FIG. 5 improves the coherent cell search performance, and that will be described below.

Since the cells 10 and 20 have the same P-SCH sequence, a channel estimated with the P-SCH symbol by the terminal is expressed as Equation 3.

$$H^{(n)}(k) = h_1^{(n)}(k)e^{j\phi_1(n)} + h_2^{(n)}(k)e^{j\phi_2(n)} \quad \text{[Equation 3]}$$

Here, n is an SCH symbol number, k is a subcarrier frequency number, and $h_1^{(n)}(k)$ and $h_2^{(n)}(k)$ are channel transfer functions for the first cell 10 and the second cell 20, respectively. As expressed in Equation 3, a channel estimated with the P-SCH includes not only a transfer function of a radio channel but also a phase rotation value.

To detect the sequence number used for the S-SCH, the terminal transforms a signal received at the time of the S-SCH symbol to a frequency domain received signal $X^{(n)}(k)$ as Equation 4, by performing a fast Fourier transform.

$$X^{(n)}(k) = h_1^{(n)}(k)S_1(k)e^{j\phi_1(n)} + h_2^{(n)}(k)S_2(k)e^{j\phi_2(n)} \quad \text{[Equation 4]}$$

Here, $S_1(k)$ and $S_2(k)$ are symbols transmitted from the first base station 11 of the first cell 10 and the base station 21 of the second cell 20, respectively.

Next, for detection of an S-SCH code, the terminal correlates the frequency domain received signal $X^{(n)}(k)$ to all available S-SCH sequences. The correlation value $Y_i^{(n)}$ between i-th S-SCH sequence $S_i(k)$ and the value obtained by removing channel components from the received signal $X^{(n)}(k)$, is expressed as Equation 5.

$$Y_i^{(n)} = \sum_k [H^{(n)}(k)]^* S_i^*(k) X^{(n)}(k)$$ [Equation 5]

$$= \sum_k \{[h_1^{(n)*}(k)e^{-j\phi_1(n)} + h_2^{(n)*}(k)e^{-j\phi_2(n)}]$$

$$S_i^*(k)[h_1^{(n)}(k)S_1(k)e^{j\phi_1(n)} + h_2^{(n)}(k)S_2(k)e^{j\phi_2(n)}]\}$$

$$= \sum_k \{[h_1^{(n)*}(k)e^{-j\phi_1(n)} + h_2^{(n)*}(k)e^{-j\phi_2(n)}]$$

$$[h_1^{(n)}(k)S_i^*(k)S_1(k)e^{j\phi_1(n)} + h_2^{(n)}(k)S_i^*(k)S_2(k)e^{j\phi_2(n)}]\}$$

$$= \sum_k \left\{ \begin{array}{l} |h_1^{(n)}(k)|^2 S_i^*(k)S_1(k) + h_1^{(n)*}(k)h_2^{(n)}(k)S_i^*(k)S_2(k)e^{-j(\phi_1(n)-\phi_2(n))} + \\ h_1^{(n)}(k)h_2^{(n)*}(k)S_i^*(k)S_1(k)e^{j(\phi_1(n)-\phi_2(n))} + |h_2^{(n)}(k)|^2 S_i^*(k)S_2(k) \end{array} \right\}$$

There are cases where the terminal uses an average of two neighboring SCH symbols to improve the cell search performance. For example, to search the first cell 10 that uses the first S-SCH code $S_1(k)$, the terminal uses an average of the n-th correlation value $Y_i^{(n)}$ and the (n+1)-th correlation value $Y_i^{(n+1)}$ for the first S-SCH code $S_1(k)$. At this time, if the terminal moves slowly, a channel variation with respect to time may be ignored, as expressed in Equation 6. Accordingly, when the two cells use orthogonal phase weight patterns as shown in FIG. 5 and Equation 7, the average correlation value may be expressed as Equation 8.

$$h_1^{(n)} \approx h_1^{(n+1)}, h_2^{(n)} \approx h_2^{(n+1)}$$ [Equation 6]

$$\phi_1^{(n)} - \phi_2^{(n)} = -(\phi_1^{(n+1)} - \phi_2^{(n+1)})$$ [Equation 7]

$$\frac{(Y_1^{(n)} + Y_1^{(n+1)})}{2} = \sum_k \{|h_1^{(n)}(k)|^2 + |h_2^{(n)}(k)|^2\} S_1^*(k)S_2(k)$$ [Equation 8]

$$\approx \sum_k |h_1^{(n)}(k)|^2$$

Here, the S-SCH code is assumed to have the characteristic of orthogonality, and $S_1^*(k)S_1(k)$ is assumed to be 1.

If the phase weight pattern of the first cell 10 is the same as the phase weight pattern of the second cell 20, the average correlation value may be expressed as Equation 9.

$$\frac{(Y_1^{(n)} + Y_1^{(n+1)})}{2} = \sum_k \{|h_1^{(n)}(k)|^2 + |h_2^{(n)}(k)|^2\} S_1^*(k)S_2(k) +$$ [Equation 9]

$$h_1^{(n)*}(k)h_2^{(n)}(k)S_1^*(k)S_2(k) + h_1^{(n)*}(k)h_2^{(n)}(k)\}$$

$$\approx \sum_k \{|h_1^{(n)}(k)|^2 + h_1^{(n)*}(k)h_2^{(n)}(k)\}$$

The average correlation value of Equation 9 has an additive component such as in Equation 10, different from the average correlation value of Equation 8, and the phase of the additive component is random. The magnitude of the average correlation value decreases as the phase of the additive component becomes more distant from 0 degrees. Accordingly, a signal to noise ratio (SNR) of the correlation value decreases and the coherent cell search performance is deteriorated in the presence of noise. Therefore, when the plurality of cells using the same sequence use the different weight patterns as described in the first exemplary embodiment of the present invention, the coherent cell search performance may be improved.

$$\sum_k (h_1^{(n)*}(k)h_2^{(n)}(k))$$ [Equation 10]

While it has been described that the base station uses one antenna in the first exemplary embodiment of the present invention, the base station may use a plurality of antennas, which will be described below as another exemplary embodiment referring to FIG. 6.

Figure 6:
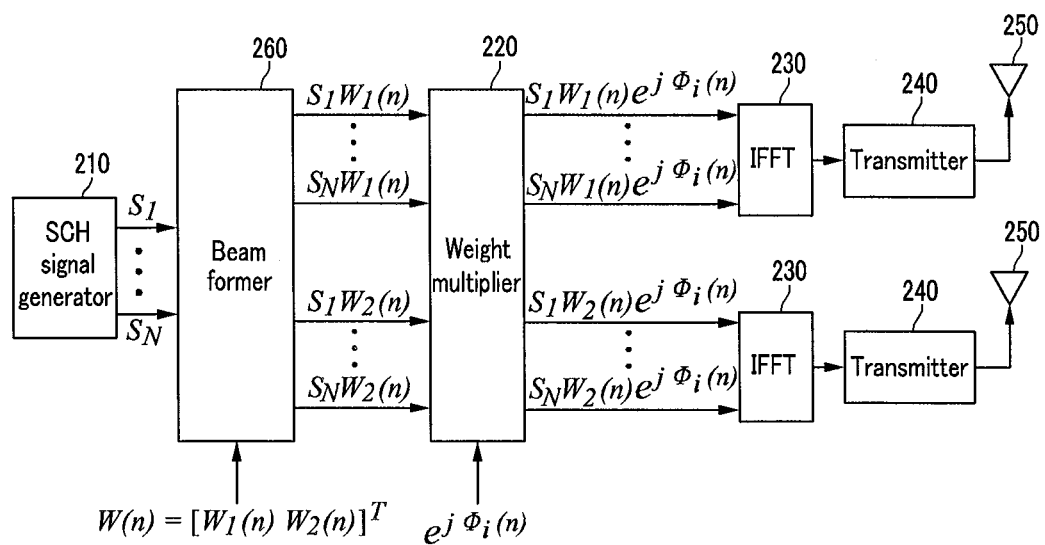

FIG. 6 shows a schematic diagram of a transmitting apparatus in a base station according to a second exemplary embodiment of the present invention.

As shown in FIG. 6, the transmitting apparatus in the base station according to the second exemplary embodiment of the present invention includes an SCH signal generator 210, a beam former 260, a weight multiplier 220, a plurality of IFFTs 230, a plurality of transmitters 240, and a plurality of antennas 250. For convenience of explanation, it is assumed that the number of antennas 250 is 2 in FIG. 6.

The SCH signal generator 210 generates an SCH symbol by using a P-SCH sequence and an S-SCH sequence, and the beam former 260 multiplies the SCH symbols by beam forming weights $w(n)=[w_1(n) w_2(n)]^T$ corresponding to the SCH symbols. The weight multiplier 220 rotates the phase of each SCH symbol multiplied by the beam forming weight. Each IFFT 230 transforms the phase-rotated SCH symbol to a time domain signal by performing an inverse fast Fourier transform, and transmits the time domain signal through the transmitter 240 and the antenna 250. At this time, the phase rotation value is determined by an SCH pattern number (i) and an SCH symbol number (n) independently of the subcarrier and the antenna number, as described in the first exemplary embodiment. If the beam forming weight is set to be determined by the SCH symbol number, the SCH symbol may be transmitted while combinations of the beam forming weight and the phase rotation value vary according to the SCH symbol transmission time.

When the beam forming weight is selected appropriately, for example when any one $w_1(n)$ or $w_2(n)$ of the beam forming weights is set as 0, the transmitting apparatus of the base station may transmit the SCH symbol via a portion of the plurality of antennas. In this case, composition of the selected antennas may vary with the symbol transmission time.

As described above, while it has been described that the sectors located in different base stations transmit the common signal in the first and second exemplary embodiments of the present invention, the preset invention is applicable to the case where a plurality of sectors in the same base station transmit the common signal. Hereinafter, the above case will be described as another exemplary embodiment referring to FIG. 7 and FIG. 8.

Figure 7:
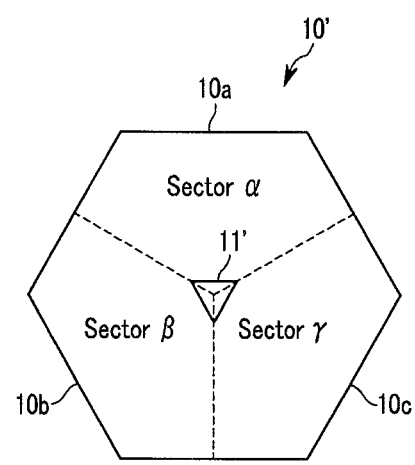
FIG. 7 shows a schematic diagram of a cell structure of the communication system according to the third exemplary embodiment of the present invention.
Figure 8:
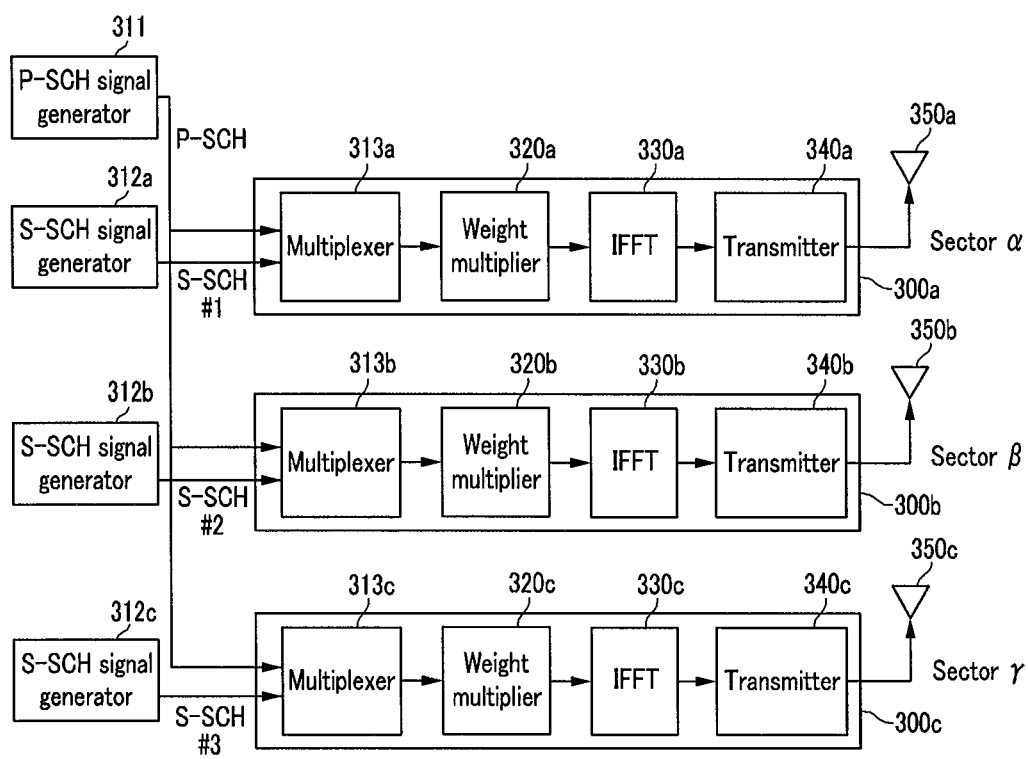

FIG. 7 shows a schematic diagram of a cell structure of a communication system according to a third exemplary embodiment of the present invention, and FIG. 8 shows a schematic diagram of a transmitting apparatus in a base station according to the third exemplary embodiment of the present invention.

Referring to FIG. 7, a base station 11' divides a cell 10' into a plurality of sectors 10a, 10b, and 10c and manages them. FIG. 7 shows the case where the cell is divided into three sectors, i.e., sector α 10a, sector β 10b, and sector γ 10c. In addition, it is assumed that the same sequence used by the plurality of sectors 10a to 10c is a P-SCH sequence in the third exemplary embodiment of the present invention.

As shown in FIG. 8, the transmitting apparatus of the base station 11' includes a P-SCH signal generator 311, a plurality of S-SCH signal generators 312a, 312b, and 312c, a plurality of sector transmitters 300a, 300b, and 300c, and a plurality of sector antennas 350a, 350b, and 350c. The S-SCH signal generators 312a to 312c, the sector transmitters 300a to 300c, and the sector antennas 350a to 350c are configured to respectively correspond to the sectors 10a to 10c. Each of the sector transmitters 300a to 300c includes a multiplexer 313a, 313b, or 313c, a weight multiplier 320a, 320b, or 320c, an IFFT 330a, 330b, or 330c, and a transmitter 340a, 340b, or 340c.

The P-SCH signal generator 311 generates a P-SCH symbol by using the P-SCH sequence, and each of the S-SCH signal generators 312a to 312c generates an S-SCH symbol S-SCH #1, S-SCH #2, or S-SCH #3 by using an S-SCH sequence of the sector corresponding to each of the S-SCH signal generators 312a to 312c. Each of the multiplexers 313a to 313c multiplexes the P-SCH symbol and the S-SCH symbol of the corresponding sector, and outputs the S-SCH symbol. Each of the weight multipliers 320a to 320c multiplies the S-SCH symbol of the corresponding sector by the weight allocated to the corresponding sector. As described in the first exemplary embodiment, the weight may be a phase weight that maintains the size of the SCH symbol and changes the phase of the SCH symbol. That is, each of the weight multipliers 320a to 320c rotates the phase of the SCH symbol by the phase rotation value allocated to the corresponding sector. Here, the phase rotation value of the phase weight $\phi_i(n)$ is determined by an SCH pattern number (i) and an SCH symbol number (n), the SCH pattern number (i) is set according to the sector of the base station (i.e., sector number), and the SCH symbol number (n) is set according to the SCH symbol transmission time. Accordingly, the phase rotation value $\phi_i(n)$ has a phase weight pattern that is determined by the sector number and the SCH symbol transmission time.

Each of the IFFTs 230a to 230c transforms the phase-rotated SCH symbol of the corresponding sector to a time domain signal by performing an inverse fast Fourier transform, and each of the transmitters 240a and 240c transforms the time domain signal to a radio frequency (RF) signal, and transmits the RF signal through the antenna 250a-250c of the corresponding sector.

While it has been described that the plurality of sectors in the same base station use sector-specific S-SCH sequences in the third exemplary embodiment of the present invention, they may use the same S-SCH sequence. Since the different phase weight patterns are used for the S-SCH symbols of the plurality of sectors even though the same S-SCH sequence is used, the phase rotation of S-SCH symbols among sectors may be randomized.

Next, the distortion of a transmit antenna beam pattern that may occur when a plurality of sectors in the same base station transmits the common signal, and the principle of resolving the distortion by using the phase weight pattern according to the third exemplary embodiment of the present invention, will be described referring to FIG. 9 to FIG. 12.

Figure 9:
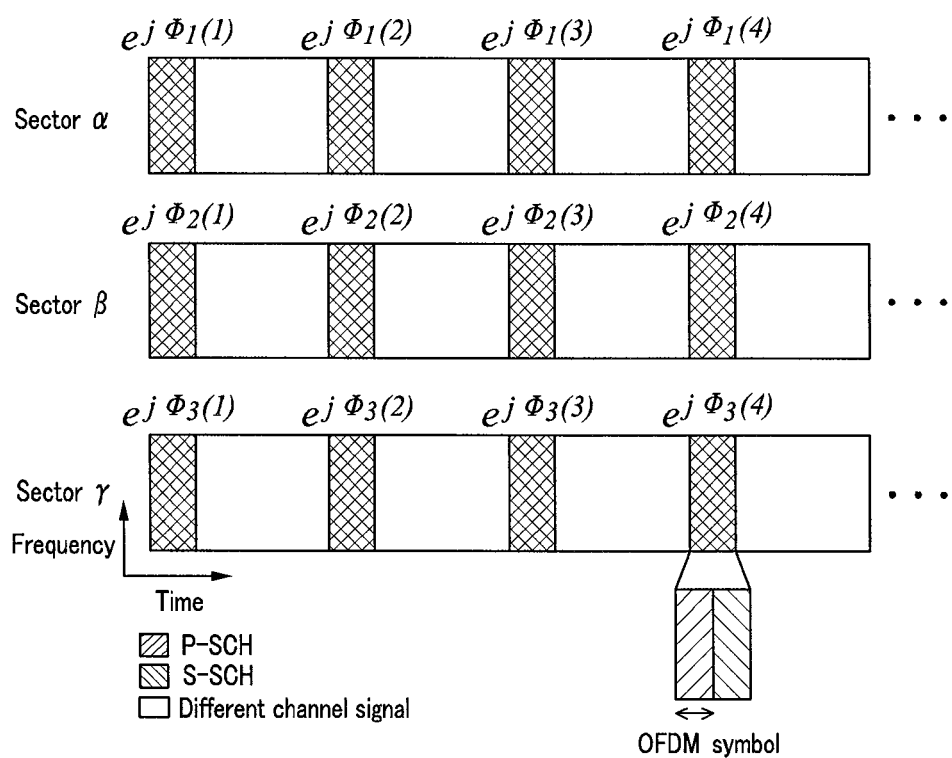

FIG. 9 shows an example where three sectors use different phase weight patterns. In detail, the sector α uses a first phase weight pattern, the sector β uses a second phase weight pattern, and the sector γ uses a third phase weight pattern. In the first phase weight pattern, the phase rotation value $\phi_1(n)$ is always set as 0 degrees independently of the SCH symbol transmission time (n). In the second phase weight pattern, the phase rotation value $\phi_2(n)$ is repeatedly set in the order of 0 degrees, 0 degrees, and 180 degrees according to the SCH symbol transmission time (n). Finally, in the third phase weight pattern, the phase rotation value $\phi_3(n)$ is repeatedly set in the order of 0 degrees, 180 degrees, and 0 degrees according to the SCH symbol transmission time (n). According to the third embodiment, the probability that a phase rotation for two neighboring symbols exists between the two different phase weight patterns becomes ⅔. Referring to the first symbol and the second symbol, the phase rotation does not exist between the first and second phase weight patterns, and the phase rotation exists between the second and third phase weight patterns and between the third and first phase weight patterns. That is, the phase rotation of S-SCH symbols between the two neighboring sectors may be randomized.

Figure 10:
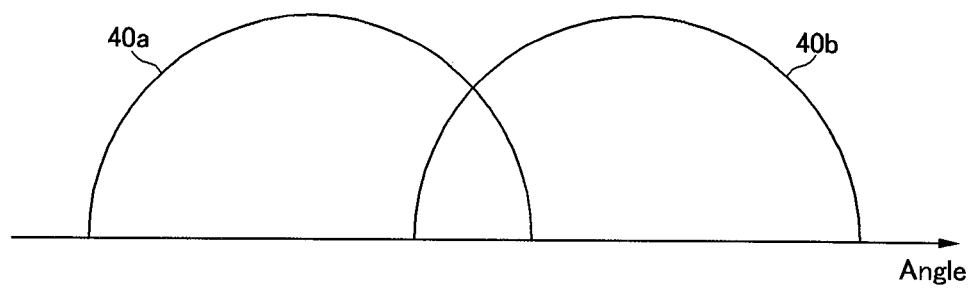
FIG. 10, FIG. 11, and FIG. 12 are drawings showing beam patterns at cell boundary angles.

When beam patterns 40a and 40b of the two sectors are formed as shown in FIG. 10 and the two sectors transmit the common signal (i.e., the P-SCH sequence), the transmit antenna beam pattern for the common signal is the sum of the beam patterns of the two sector antennas. In this case, the phase of the beam pattern 40a or 40b for each sector antenna is mainly determined by an RF transmitter (340a or 340b of FIG. 8) of each sector. The beam patterns 40a and 40b of the two sectors have independent phase values from each other since the two sectors use different RF transmitters. Accordingly, the transmit antenna beam patterns may be cancelled or enhanced by each other at the sector boundary angle where the two sector antenna beam patterns overlap.

Figure 11:
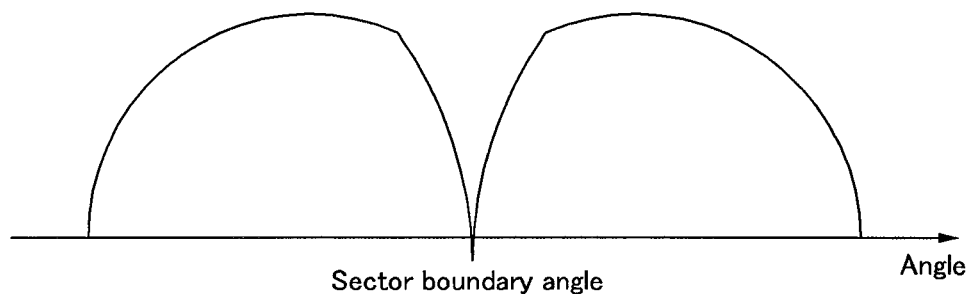
Figure 12:
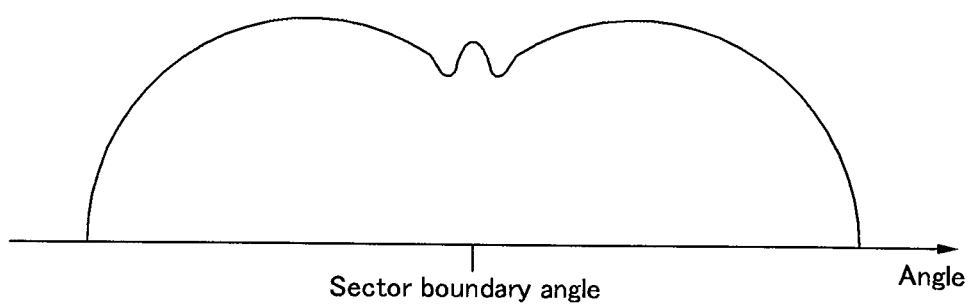

When the transmit antenna beam patterns for the common signal are cancelled by each other, since the signal power transmitted toward the direction of the sector boundary angle is very low, the terminal located at the sector boundary angle receives the common signal with reduced power. In the case of FIG. 11, if there is the phase rotation of 180 degrees between the two sectors that transmit the common signal, the common signal transmitted to the two sectors may be enhanced at the sector boundary angle as shown in FIG. 12. Since the transmit antenna beam patterns are cancelled or enhanced with time by using the different phase weight patterns between the two sectors as described in the third exemplary embodiment of the present invention, the problem that the transmit antenna beam patterns are continuously cancelled can be resolved.

Figure 13:
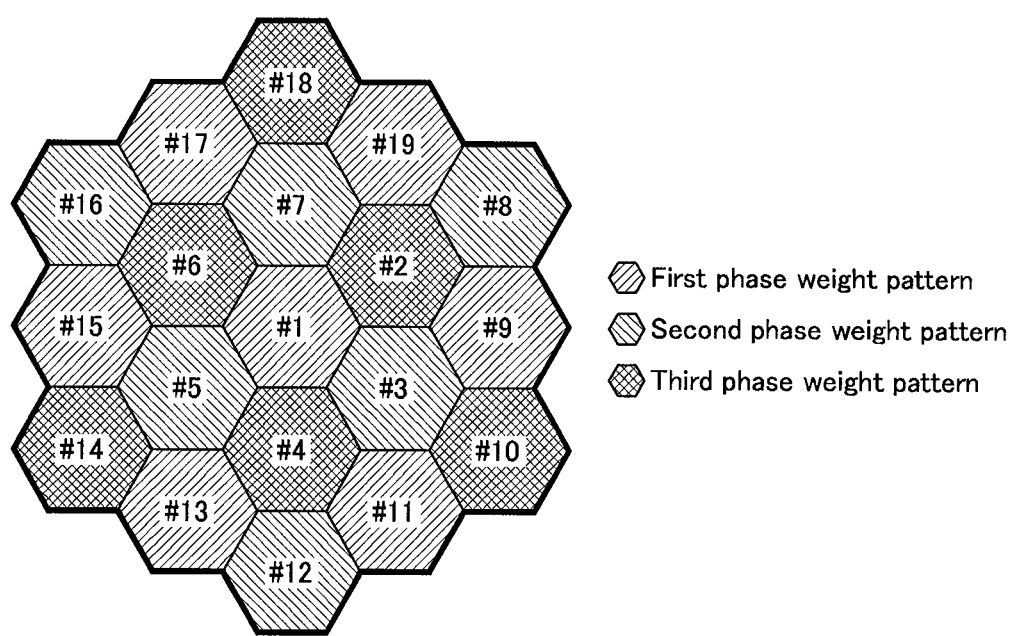
FIG. 13 is a schematic diagram of a structure of a communication system according to a fourth exemplary embodiment of the present invention.

Three or more phase weight patterns shown in FIG. 9 may be applicable to the cells belonging to the different base stations. In detail, when the communication system uses only two phase weight patterns, the case where the neighboring cells use the same phase weight pattern may occur. Therefore, a communication system according to a fourth exemplary embodiment of the present invention uses three or more phase weight patterns such that the neighboring cells use different phase weight patterns. That is, the neighboring cells can use different phase weight patterns with the three different phase weight patterns as shown in FIG. 13. FIG. 13 shows the case where the first to third phase weight patterns are used in 19 cells #1 to #19

As described above, while it has been described that the common signal is used for the synchronization channel in the first to fourth exemplary embodiments of the present invention, the common signal may be applied to a broadcast channel to improve the performance of the broadcast channel. As shown in FIG. 1, when the two sectors transmit the common signal, the channel $H^{(k)}(n)$ for the common signal may be given as Equation 3, and forms different fading according to the combination of phase weight $[\phi_1^{(n)},\phi_2^{(n)}]$ used in two sectors. At this time, if the phase weight patterns described in the above exemplary embodiments are used, the combination of the phase weight changes with time. Hence, the fading of the broadcast channel changes with time. The performance of the broadcast channel may be improved since the change of the fading with time means the generation of a time diversity gain.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiments of the present invention, but, on the contrary, are intended to be realized by a program for realizing functions corresponding to the configurations of the exemplary embodiments of the present invention or a recording medium for recording the program.

The invention claimed is:

1. A method of transmitting a common signal in a first base station, the common signal being the same as a signal transmitted by a second base station, the method comprising:
    setting a weight according to a first weight pattern determined by a transmission time of the common signal and a pattern number allocated to the first base station;
    generating a transmission signal by multiplying the common signal by the weight; and
    transmitting the transmission signal,
    wherein the first weight pattern is different from a second weight pattern of a weight multiplied to the common signal that is transmitted by a second base station.

2. The method of claim 1, further comprising generating the common signal by using a sequence allocated to the first base station and the second base station in common.

3. The method of claim 1, wherein the weight is a weight that rotates a phase of the common signal with a phase rotation value.

4. The method of claim 3, wherein the phase rotation value is determined by the transmission time of the common signal and the pattern number allocated to the first base station.

5. The method of claim 1, wherein the first base station comprises a plurality of antennas, and
    the generating comprises multiplying the common signal by beam forming weights for the plurality of antennas.

6. The method of claim 5, wherein the beam forming weights are determined by the transmission time of the common signal.

7. A method of transmitting a common signal to a plurality of sectors in a base station, the method comprising:
    setting a weight for each of the sectors of the base station based on a weight pattern determined by a transmission time of the common signal and a pattern number allocated to each of the sectors of the base station;
    generating a transmission signal for each of the sectors of the base station by multiplying the common signal by the weight for a corresponding sector of the base station; and
    transmitting the transmission signal to the corresponding sector of the base station,
    wherein the sectors includes a first sector and a second sector, and the weight pattern of the weight for the first sector is different from the weight pattern of the weight for the second sector.

8. The method of claim 7, wherein the weight is a weight that rotates a phase of the common signal with a phase rotation value.

9. The method of claim 7, wherein the phase rotation value is determined by the transmission time of the common signal and the pattern number allocated to each of the sectors.

10. The method of claim 7, wherein each of the sectors of the base station comprises a plurality of antennas, and
    the generating of the transmission signal for each of the sectors of the base station comprises multiplying the common signal by beam forming weights for the plurality of antennas in each of the sectors of the base station.

11. The method of claim 10, wherein the beam forming weights are determined by the transmission time of the common signal.

12. A method of generating a signal to be transmitted in common to a plurality of cells including a first cell and a second cell in a communication system, the method comprising:
    generating a common signal to be transmitted to the first cell and the second cell in a first base station and a second base station;
    generating a signal to be transmitted to the first cell by multiplying the common signal by a first weight in the first base station; and
    generating a signal to be transmitted to the second cell by multiplying the common signal by a second weight in the second base station,
    wherein the first weight has a first weight pattern determined by a transmission time of the common signal,
    the second weight has a second weight pattern determined by the transmission time of the common signal, and
    the first weight pattern is different from the second weight pattern.

13. The method of claim 12, wherein each of the first weight and the second weight is a weight that rotates a phase of the common signal with a phase rotation value.

14. The method of claim 13, wherein the phase rotation value is determined according to the transmission time of the common signal by the first weight pattern and the second weight pattern.

15. A method of generating a signal to be transmitted in common to a plurality of sectors including a first sector and a second sector in a base station, the method comprising:
    generating a common signal to be transmitted to the first sector and the second sector;
    generating a signal to be transmitted to the first sector by multiplying the common signal by a first weight; and
    generating a signal to be transmitted to the second sector by multiplying the common signal by a second weight,
    wherein the first weight has a first weight pattern determined by a transmission time of the common signal,
    the second weight has a second weight pattern determined by the transmission time of the common signal, and
    the first weight pattern is different from the second weight pattern.

16. The method of claim 15, wherein each of the first weight and the second weight is a weight that rotates a phase of the common signal with a phase rotation value.

17. The method of claim 16, wherein the phase rotation value is determined according to the transmission time of the common signal by the first weight pattern and the second weight pattern.

18. An apparatus for transmitting a common signal in a first base station, the common signal being the same as a signal transmitted by a second base station, the apparatus comprising:
means for setting a weight according to a weight pattern determined by a transmission time of the common signal and a pattern number allocated to the first station;
means for generating a transmission signal by multiplying the common signal by the weight; and
means for transmitting the transmission signal,
wherein the first weight pattern is different from a second weight pattern of a weight multiplied to the common signal that is transmitted by a second base station.

19. The apparatus of claim 18, further comprising means for generating the common signal by using a sequence allocated to the first base station and the second base station in common.

20. An apparatus for transmitting a common signal to a plurality of sectors in a base station, the apparatus comprising:
means for setting a weight for each of the sectors of the base station according to a weight pattern determined by a transmission time of the common signal and a pattern number allocated to each of the sectors of the base station;
means for generating a transmission signal for each of the sectors of the base station by multiplying the common signal by the weight for a corresponding sector of the base station; and
means for transmitting the transmission signal to the corresponding sector of the base station,
wherein the sectors includes a first sector and a second sector, and the weight pattern of the weight for the first sector is different from the weight pattern of the weight for the second sector.

21. An apparatus for generating a signal to be transmitted in common to a plurality of cells including a first cell and a second cell in a communication system, the apparatus comprising:
means for generating a common signal to be transmitted to the first cell in the first base station;
means for generating the common signal to be transmitted to the second cell in a second base station;
means for generating a signal to be transmitted to the first cell by multiplying the common signal by a first weight in the first base station; and
means for generating a signal to be transmitted to the second cell by multiplying the common signal by a second weight in the second base station,
wherein the first weight has a first weight pattern determined by a transmission time of the common signal,
the second weight has a second weight pattern determined by the transmission time of the common signal, and
the first weight pattern is different from the second weight pattern.

22. An apparatus for generating a signal transmitted in common to a plurality of sectors including a first sector and a second sector in a base station, the apparatus comprising:
means for generating a common signal to be transmitted to the first sector and the second sector;
means for generating a signal to be transmitted to the first sector by multiplying the common signal by a first weight; and
means for generating a signal to be transmitted to the second sector by multiplying the common signal by a second weight,
wherein the first weight has a first weight pattern determined by a transmission time of the common signal,
the second weight has a second weight pattern determined by the transmission time of the common signal, and
the first weight pattern is different from the second weight pattern.

* * * * *